(12) United States Patent
Morales (10) Patent No.: US 11,307,819 B1
(45) Date of Patent: Apr. 19, 2022

(54) PRINT PROCESS CONTROL SYSTEM AND METHODS

(71) Applicant: Kyocera Document Solutions, Inc., Osaka (JP)

(72) Inventor: Javier A. Morales, Rochester, NY (US)

(73) Assignee: Kyocera Document Solutions, Inc., Osaka (JP)

( * ) Notice: Subject to any disclaimer, the term of this patent is extended or adjusted under 35 U.S.C. 154(b) by 0 days.

(21) Appl. No.: 17/187,378

(22) Filed: Feb. 26, 2021

(51) Int. Cl.
*G06F 3/12* (2006.01)

(52) U.S. Cl.
CPC .......... *G06F 3/1253* (2013.01); *G06F 3/1205* (2013.01); *G06F 3/1268* (2013.01); *G06F 3/1285* (2013.01)

(58) Field of Classification Search
CPC combination set(s) only.
See application file for complete search history.

(56) References Cited

U.S. PATENT DOCUMENTS

| | | | |
|---|---|---|---|
| 7,768,672 B2 | 8/2010 | Gil et al. | |
| 2005/0213144 A1 | 9/2005 | Uejo | |
| 2013/0107313 A1* | 5/2013 | Kirby | G06F 3/1285 358/1.15 |
| 2015/0077800 A1* | 3/2015 | Yamagishi | G06F 3/1208 358/1.15 |
| 2016/0188268 A1* | 6/2016 | Yamagishi | H04N 1/6036 358/1.15 |
| 2017/0242642 A1* | 8/2017 | Barribeau | G06F 3/126 |
| 2019/0377529 A1* | 12/2019 | Ohkawa | G06F 3/1263 |
| 2020/0285424 A1* | 9/2020 | Matsuzaka | G06F 3/1204 |
| 2021/0232351 A1* | 7/2021 | Wagensommer | G06F 3/1285 |
| 2021/0258446 A1* | 8/2021 | Schalk | G06F 3/1273 |

* cited by examiner

*Primary Examiner* — Helen Zong
(74) *Attorney, Agent, or Firm* — Millen, White, Zelano & Branigan, P.C.; William Nixon (57) ABSTRACT

A print process control system includes a plurality of printing devices and an order management system to manage print jobs to the printing devices. Each printing device has an achievable quality level corresponding to its ability to meet color printing requirements. Print jobs are assigned a quality level when received within the system. The assigned quality level is used to provide a cost value such that different quality levels result in different prices for a print job. The order management system also routes and tracks the print jobs according to the assigned quality levels and the achievable quality levels of the printing devices. The printing device also are grouped according to achievable quality levels to further manage printing operations.

20 Claims, 7 Drawing Sheets

| A. Printing Device | B. Achievable Quality | C. Assigned Print Jobs |
|---|---|---|
| 104 | 104Q - Standard (114B) | 110A, 110B, 110C → 110A |
| 106 | 106Q - Premium (114A) | 110A, 110B, 110C, 402 → 110B / 402 |
| 108 | 108Q - Budget (114C) | 110A or 110C → 110C |

| D. Printing Jobs | E. Quality Level | F. Cost Valve |
|---|---|---|
| 110A | 112A - Budget (114C) | 450 |
| 110B | 112B - Standard (114B) | 452 |
| 110C | 112C - Cheap (114D) | 454 |
| 402 | 112D - Premium (114A) | 456 |

PRINT PROCESS CONTROL SYSTEM AND METHODS

FIELD OF THE INVENTION

The present invention relates to a print process control system that defines a quality level for a print job and uses the defined quality level to perform printing operations. The defined quality level also may be used to determine a cost associated with the print job.

DESCRIPTION OF THE RELATED ART

Process control for print shops usually revolves around either matching an industry-standard print condition or matching a repeatable press condition. In this instance, a press is characterized so that the characterization becomes the target for the print shop. In either case, the targets represent the gamut that the press is expected to reproduce reliably. While it is understood that achieving the target gamut means that the press will reproduce print jobs as expected, this standard may be both too strict and too loose in some cases. The act of keeping a press running within tight tolerances requires additional maintenance. The maintenance takes time away from production and, ultimately, from press profitability. In addition, this additional maintenance may not be required to reproduce print jobs at an acceptable level of quality depending on the nature of the print jobs to be printed. While there are inspection systems that can be used to evaluate whether a specific print job achieves the required level of quality, these systems require significant time to setup and must be configured for individual job. These conventional systems do not allow for work with any job in a print job.

SUMMARY OF THE INVENTION

A print process control method is disclosed. The method includes receiving a request for a print job of a document. The method also includes defining a quality level from a plurality of quality levels for the print job for each of a plurality of printing devices. The quality level corresponds to a deviation between a potential reproduction of a color and an actual reproduction of the color. The method also includes determining a cost value for printing the document according to the quality level. The method also includes routing the print job to a first printing device from the plurality of printing devices to process the print job according to the quality level. The first printing device can achieve the quality level for the print job. The method also includes confirming the first printing device can achieve the quality level defined for the print job and that the cost value is paid. The method also includes printing the document of the print job at the quality level on the first printing device.

A method for managing a plurality of printing devices within a printing system is disclosed. The method includes determining a quality level of a plurality of quality levels for each of the plurality of printing devices. The quality level corresponds to a deviation between a potential reproduction of a color and an actual reproduction of the color. The method also includes grouping the plurality of printing devices into at least two groups of printing devices. The quality level for each group is the same. The method also includes receiving a print job having a defined quality level within the printing system. The method also includes selecting one of the at least two groups of printing devices according to the defined quality level. The method also includes routing the print job to a printing device within the selected group of printing devices. The method also includes printing the print job at the printing device.

A print process control system of a plurality of printing devices is disclosed. The system is configured to receive a request for a print job of a document. The system also is configured to define a quality level from a plurality of quality levels for the print job for each of a plurality of printing devices. The quality level corresponds to a deviation between a potential reproduction of a color and an actual reproduction of a color. The system also is configured to determine a cost value for printing the document according to the quality level. The system also is configured to route the print job to a first printing device from the plurality of printing devices to process the print job according to the quality level. The first printing device can achieve the quality level for the print job. The system also is configured to confirm the first printing device can achieve the quality level defined for the print job and that the cost value is paid. The system also is configured to print the document of the print job at the quality level on the first printing device.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments may utilize the following definitions:

Printer calibration—a process for ensuring consistent color quality generated by printing devices.

Test color patch—an area, which may be rectangular, containing a single color on a test color sheet.

Target print job—a printed page, containing rows of test color strips.

Color measurement tool—a tool, such as a spectrophotometer, for measuring color patches on a test color sheet. The measurement data may consist of International Commission on Illumination (CIE) XYZ or CIELAB values. CIELAB may refer to a color space specified by the CIE to describe all the colors visible to the human eye that is used as a device-independent reference.

The disclosed embodiments include a system that allows the print shop to specify and then track the acceptable level of print quality for both individual customers and individual print jobs for the customers. In order to enable the use of this functionality, the disclosed embodiments track customer and job information with an enhancement to include additional functionality about the customer and perhaps about specific print jobs. Specifically, the print shop may define certain levels of quality for print jobs. The disclosed system may manage print shop customers by specifying a quality level for each of the customers. When the customer orders a print job, the print job automatically is assigned to the customer's preferred quality level.

Figure 1:
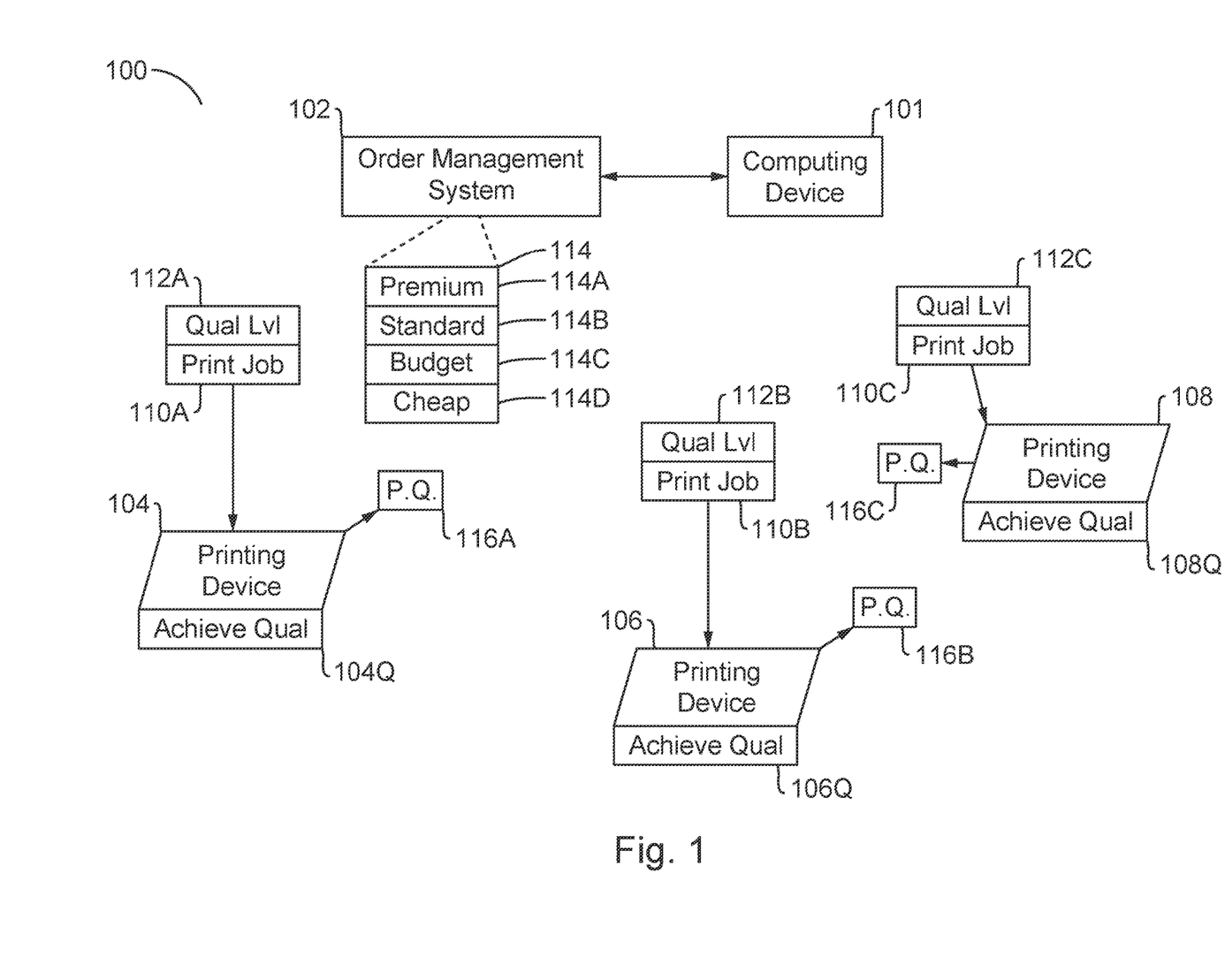
FIG. 1 illustrates a print process control system for managing printing operations on a plurality of printing devices according to the disclosed embodiments.

FIG. 1 depicts a print process control system 100 for managing printing operations on a plurality of printing devices according to the disclosed embodiments. Print process control system 100 may manage print jobs to a plurality of printing devices, shown as printing devices 104, 106, and 108. An example of the components of a printing device is disclosed by FIG. 2. Order management system 102 may queue and forward print jobs to the printing devices according to the disclosed embodiments. In some embodiments, order management system 102 may be a server connected via a network with the printing devices.

The printing devices may receive print jobs within print process control system 100. For example, print job 110A may be sent to printing device 104, print job 110B may be sent to printing device 106, and print job 110C may be sent to printing device 108. The print jobs may be different in content, paper media, size, and other factors. The print jobs also may differ in quality level, which may impact cost of the print jobs, the printing device used to print the print jobs, and how print jobs are tracked within system 100.

Print process control system 100 includes additional functionality about the customer and about specific jobs to track customer and job information. Specifically, system 100 using order management system 102 may define certain levels of quality for print jobs. Order management system 102 manages print shop customers, such as an MIS or Web2Print system, may be configured to specify a quality level for each of the customers. When the customer orders a print job, the print job is automatically assigned to the customer's preferred quality level.

The customer also may elect to specify the expected quality level for a specific job. The specified quality level may be entered into order management system 102. For example, order management system 102 may be a web-to-print commercial printing system. Partners and customers may submit print jobs on a website that are then printed within print process control system 100. When entering the print job, the customer may select a quality level for the print job. Pricing for the print job also may be provided, which reflects a premium or discount based on the required quality level.

Thus, print process control system 100 tracks not just customer information but also expected quality information to enhance customer and order management. Customers are provided with the ability to see differential pricing for different quality levels. A customer is allowed to decide on the quality level for which he/she wants to pay. Thus, the disclosed embodiments provide a web-to-print solution, which offer online storefronts for print shops, to offer tiered pricing based on schedule and based on the quality of the materials, such as premium paper, or the process, such as CMYK+OG printing versus CMYK printing.

Print process control system 100 may be configured to track any customer information that the print shop wants to track. This information, however, is often contextless, which means that it is just data and has no intrinsic meaning to the system itself. The disclosed embodiments, on the other hand, track the required print quality level as a metric that has intrinsic meaning within the system. As such, system 100 may aggregate information about the achievable quality levels for all printing devices in the print shop to schedule or route print jobs accordingly. This features automates or optimizes the print process within system 100.

Print process control system 100 also may use job costing information to determine pricing between print jobs. The feature of tracking quality levels would allow the disclosed embodiments to use only relevant printing devices when generating a price quote for a specific job. System 100 may look to those printing devices that can achieve the required quality level when considering where to print. The disclosed embodiments may automatically track quality. They also may offer differential pricing for different quality levels. The scheduling and routing features associated with differential pricing based on quality levels also applies to web-to-print systems.

Another feature of the disclosed embodiments is providing customers the option to specify a quality level for a print job while also providing them with differential pricing for the quality levels. Another feature of the disclosed embodiments is that the print shop may aggregate information about the quality requirements for their customers in order to provide the option to consider allocating different quality targets to different printing devices.

For example, print process control system 100 may consider installing 15 printing devices. As disclosed above, the system may offer customers the ability to choose the quality level for which they would like to pay. The customer may then track the distribution of work at different quality levels and assign quality targets to printing devices per that distribution. Using the above example, if only 10% of customers want to match colors at premium quality level 114A, 20% want to match at standard quality level 114B, and the remaining 70% are comfortable with budget quality level 114C or cheap quality level 114D, then system 100 may specify that 2 printing devices be kept at a tolerance for premium quality level 114A, 3 printing devices be kept at a tolerance for standard quality level 114B, and 10 printing devices be kept at a tolerance for budget quality level 114C.

In some embodiments, print process control system 100 may track color reproduction performance for all printing devices. The tracking of color reproduction performance means tracking the gamut that a given printing device can theoretically reproduce as well as tracking the current state of the printing device. For example, printing device 106 may be able to reproduce characterized reference print condition (CRPC) 6, or CRPC6 if system 100 follows a rigorous maintenance schedule. If system 100, however, wants to perform maintenance on a less regular basis, then printing device 106 may only be able to achieve CRPC5 or CRPC4.

Another feature of the disclosed embodiments includes tracking both the potential and actual color reproduction performance for a printing device in order to allow system 100 to allocate print jobs based on the printing device's current and theoretical ability to reproduce the print jobs. For example, print process control system 100 may track the best possible color for a printing device, such as CRPC7 at the premium quality level, which should be done right after maintenance or calibration of the printing device. Print process control system 100 also will periodically check the performance of the printing device, which without maintenance declines over time as the printing device drifts away from calibration. Thus, print process control system 100 may schedule maintenance based on the quality level of print jobs within the system.

In some embodiments, print process control system 100 may track performance but not require maintenance of the printing device. For example, printing device 108 has the capacity to achieve CRPC7 at premium quality level 114A but at this instance, it can only achieve CRPC6 at standard quality level 114B. Thus, print jobs requiring premium quality level 114A will not be sent to printing device 108, or may go into a queue until maintenance is complete on the printing device. Thus, the disclosed embodiments may assign print jobs to printing devices based on the current color reproduction accuracy versus the potential color reproduction accuracy.

This feature may be extended to scheduling where print process control system 100 may schedule print jobs based on their quality requirements. Print process control system 100 also may schedule printing device maintenance to bring the quality level up ahead of print jobs that require the higher level. This feature would allow system 100 to minimize downtime for maintenance while ensuring that every print job is printed at the required quality level. The job scheduling itself would consider the time required for maintenance when determining the possible time frame in which a print job could be printed. Print process control system 100 also may compile the high-quality print jobs into a few printing devices as possible in order to minimize the printing devices that would require maintenance.

Order management system 102 may route print jobs to printing devices in accordance with the above disclosed embodiments. It, however, also may route jobs to one printing device for immediate printing if the printing device can print the print job without maintenance. Order management system 102 also may route the print jobs to another queue so that print job can be held until maintenance is performed so the required gamut can be reproduced. Thus, the disclosed embodiments may use the required quality levels to influence job routing by considering a printing device's current ability to reproduce colors at a specific level of quality. This feature is different than considering the printing device's ideal quality. Instead, it considers the current quality.

Alternatively, a printing device's DFB may receive all print jobs but then prevent printing of print jobs that require a level of quality that the printing device cannot currently achieve. After maintenance is performed on the printing device, the printing device may determine the gamut that the printing device can reproduce and automatically release jobs that were previously held because the printing device could not reproduce the required gamut. Thus, for example, printing device 104 is able to evaluate its own print quality 116A in a meaningful way and to influence job processing.

Thus, the disclosed embodiments determine whether print jobs queued to print should print based on the printing device's current quality level. Typically, when production printing devices do "resource-based scheduling," they evaluate items like media, finisher status, output bin, and tray status in order to determine whether a print job should print or now. The disclosed embodiments add print quality.

Referring back to FIG. 1, computing device 101 may be connected to order management system 102. These components may be connected over a network, such as a web-to-print environment. One or more computing devices may be connected to order management system 102. Customers may send print jobs for printing within system 100 through order management system 102.

As disclosed above, one may specify a quality level for one or more print jobs. For example, quality levels 114 include premium quality level 114A, standard quality level 114B, budget quality level 114C, and cheap quality level 114D. The quality levels may correspond to color tolerances within the gamut of colors available on a printing device. The tolerances may correspond to the tightness of color quality, or the distance between locations of specific colors in different places. In some embodiments, the tolerance with relate to the deviation between a potential reproduction of a color and the actual reproduction of the color. "Potential" reproduction of a color also includes a desired reproduction of the color specified by the print job. This tolerance may be represented by $\Delta E$ or dE.

Thus, premium quality level 114A may represent a printing gamut having spot color tolerance of 2dE. Standard quality level 114B may represent a printing gamut having spot color tolerance of 4dE. Budget quality level 114C may represent a printing gamut having spot color tolerance of 6dE. Cheap quality level 114D may represent a printing gamut having spot color tolerance of 8dE. In some embodiments, the deviation allowed for a cheap quality level print job is greater than that of the other quality levels. In contrast, the premium quality level has the tightest or smallest allowable deviation between the potential reproduction of a color and the actual reproduction.

Thus, quality levels 114 provide a measurable metric that is used to schedule, price, route, and manage print jobs as well as the maintenance of printing devices within system 100. For example, order management system 102 may send print job 110A having a print job quality level 112A of budget quality level 114C to printing device 104. Printing device 104 may have an achievable quality level 104Q that allows print job 110A to be printed. For example, achievable quality level 104Q may be standard quality level 114B. Thus, print job 110A with print job quality level 112A of budget quality level 114C is acceptable to be printed.

Printing device 106 may receive print job 110B having a quality level 112B assigned or specified for the print job by order management system 102. Printing device 106 includes an achievable quality level 106Q of premium. Thus, printing device 106 should be able to take all print jobs generated within system 100. Quality level 112B of print job 110B is standard such that it may be accepted and processed at printing device 106. Printing device 106 may be the only printing device within its group that can achieve the premium quality level. Thus, all print jobs specifying premium quality level 114A may be routed to printing device 106.

Printing device 108 may receive print job 110C having a quality level 112C assigned or specified for the print job by order management system 102. Printing device 108 may include the lowest achievable quality level within system 100. Achievable quality level 108Q may correspond to budget quality level 114C. Print jobs 110A and 110B may not be processed at printing device 108 absent some action being taken to improve the achievable quality level for printing operations. Print job 110C may have a quality level 112C of cheap quality level 114D and, therefore, may be received at printing device 108.

System 100 also includes the feature of printing devices 104, 106, and 108 being able to evaluate their own print quality in a meaningful way. Each printing device may be able to provide the respective print quality to order management system 102 in order to route and manage print jobs. Printing device 104 may have a print quality 116A, which may be expressed as gamut+dE. Printing device 106 may have print quality 116B while printing device 108 has print quality 116C. The print qualities may differ between devices. Print quality may reflect the achievable quality level in the specified printing device.

Figure 2:
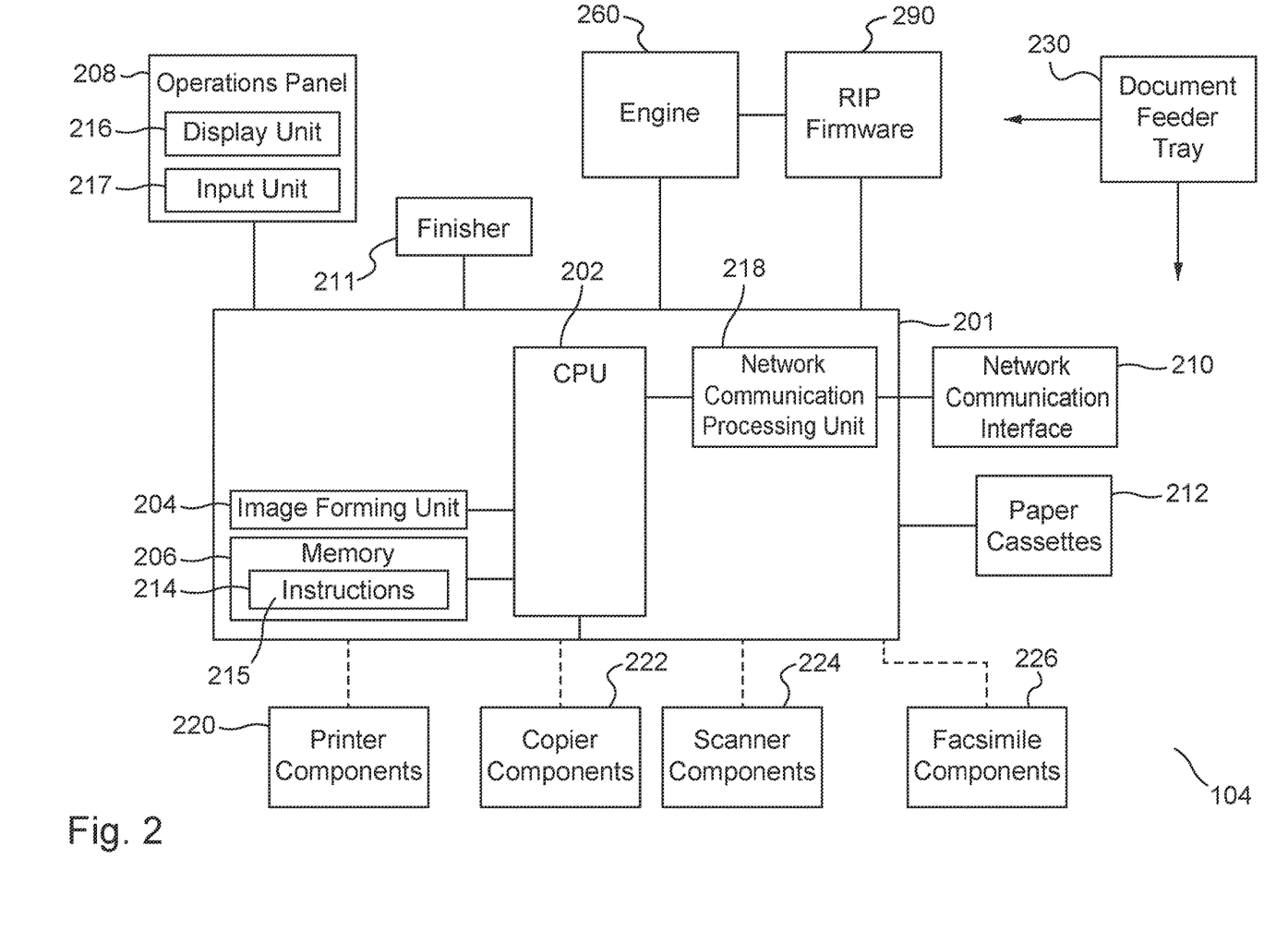
FIG. 2 illustrates a block diagram of components of a printing device according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100. As disclosed above, printing device 104 may send and receive data from order management server 102 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or network service 106. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the toner onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with network service 106 via network communication interface 210 by utilizing a network protocol, such as the ones listed above. In some embodiments, printing device 104 communicates with network service 106 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from network service 106.

Figure 3:
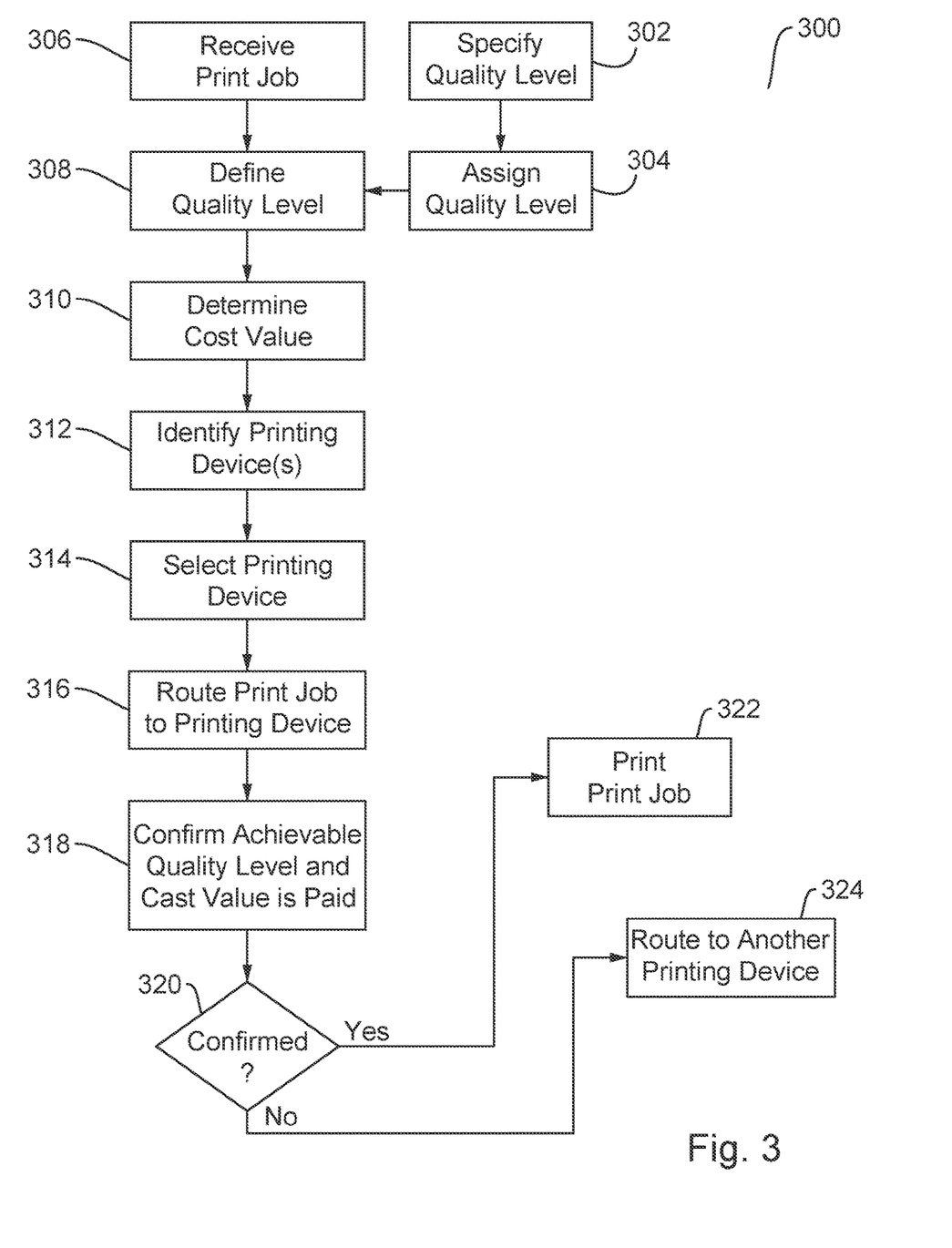
FIG. 3 illustrates a flowchart for controlling a print process using a plurality of printing devices according to the disclosed embodiments.
Figure 4:
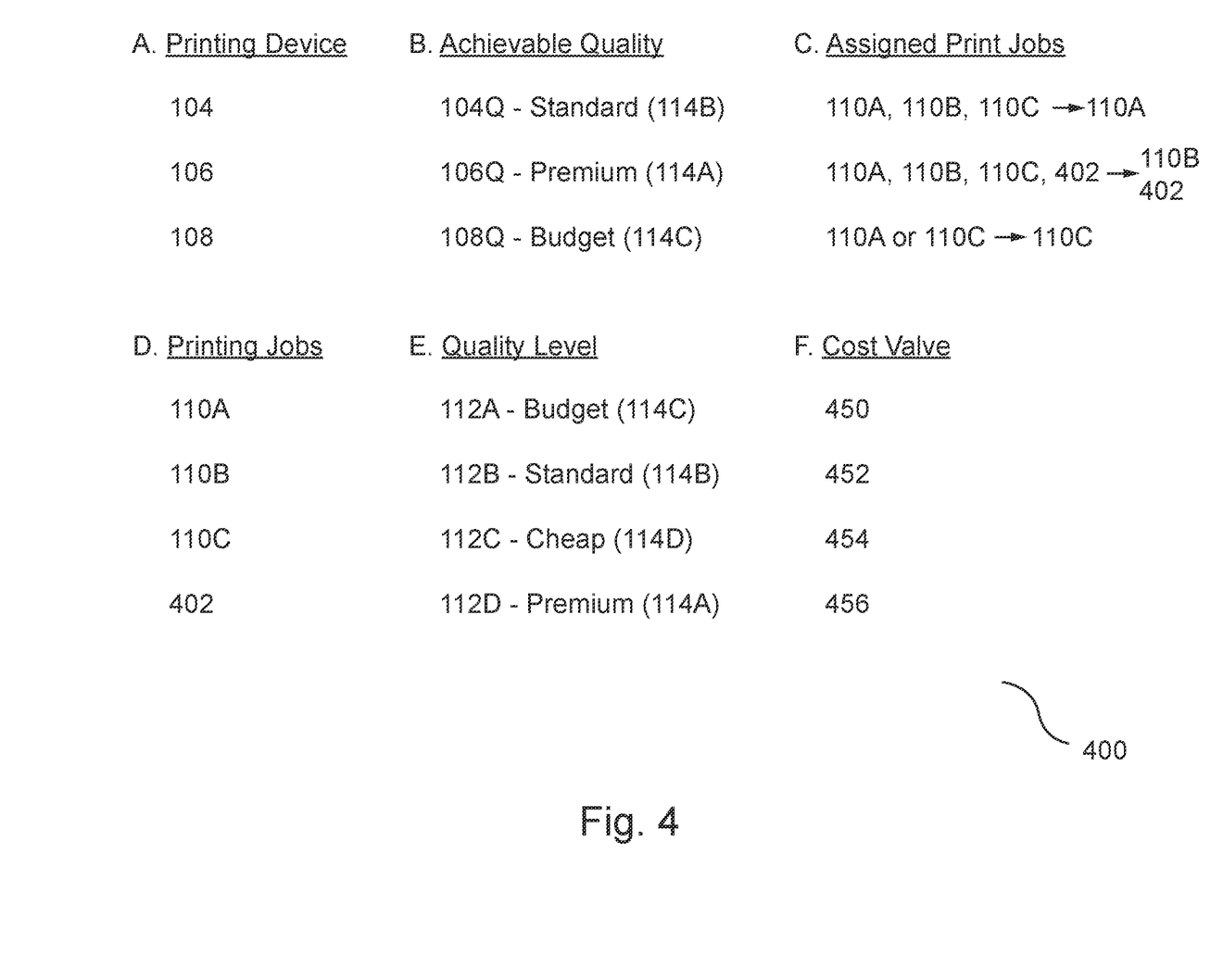
FIG. 4 illustrates a table showing parameters for printing devices to route print jobs according to the disclosed embodiments.

FIG. 3 depicts a flowchart 300 for controlling a print process using a plurality of printing devices 104, 106, and 108 according to the disclosed embodiments. Flowchart 300 may refer to FIGS. 1, 2, and 4 for illustrative purposes. The embodiments disclosed by flowchart 300, however, are not limited to FIGS. 1, 2, and 4. FIG. 4 depicts a table 400 showing parameters for printing devices to route print jobs according to the disclosed embodiments. Some features disclosed in table 400 refer to elements shown in FIGS. 1 and 2, also for illustrative purposes.

Step 302 executes by specifying a quality level 114 for print jobs of a specific client or customer. For example, some clients may want all their print projects to be at a certain quality level, such as standard quality level 114B. Print shops may provide customers the option to specify the quality level from their printing projects. Alternatively, print shops may assign the quality level based on the print jobs themselves. In some embodiments, order management system 102 may assign the quality level after receiving input from the print shop based on the customer's needs. The print shop may aggregate information about the quality requirements for their customers in order to allocate different quality targets to different printing devices. Step 304 executes by assigning quality level 114 to a customer's print projects within system 100.

Step 306 executes by receiving a print job, such as print job 110A, within system 100. A plurality of print jobs also may be received in this step. For example, referring to column D in table 400, print jobs 110A, 110B, 110C, and 402 may be received. Step 308 executes by defining quality level 114 for each print job. In some embodiments, quality level 114 may be assigned based on the customer's specifications. In other embodiments, the quality level is assigned as the print jobs are received. As noted above, the customer may specify the quality level. Alternatively, order management system 102 may assign the quality level based on information provided with the orders.

Referring to table 400, column E may refer to the quality levels assigned to each print job. For example, print job 110A has an assigned quality level 112A of budget quality level 114C. Print job 110B has an assigned quality level 112B of standard quality level 114B. Print job 110C has an assigned quality level 112C of cheap quality level 114D. Print job 402 has an assigned quality level 112D of premium quality level 114A. Print job 402 and assigned quality level 112D are not shown in FIG. 1, but it may be appreciated that these features are received and generated in system 100 by order management system 102.

Step 310 executes by determining a cost value for each print job. Customers may have the ability to see differential pricing for different quality levels. This feature allows the customers to decide on the quality level for which they want to pay. This benefit differs from conventional printing systems that do not offer tiered pricing based on the gamut and stringency of color matching. Further, this feature differs from pricing structures that offer tiered pricing based on schedule or the quality of the materials, such as premium paper, or the process. It should be noted that this step may occur before any of the previous steps such that the customer can view the different prices for each print job along with applicable quality levels.

Referring to table 400, column F shows the calculated cost values for each print job listed in column D Cost value 450 is the amount needed to complete print job 110A. Cost value 452 is the amount needed to complete print job 110B. Cost value 454 is the amount needed to complete print job 110C. Cost value 456 is the amount needed to complete print job 402. Based on the assigned quality levels, cost value 456 should be higher than the other costs values as print job 402 is assigned premium quality level 114A. Print job 110C has cost value 454, which should be least amount to pay to complete the print job. Cost values also may depend on the printing device selected to complete the print job. As this selection also depends on the assigned quality level, the quality needed to complete the print job is still a factor in pricing.

Step 312 executes by identifying one or more printing devices within system 100 to process the print jobs. Printing devices are selected based on their capability to complete the print job at the assigned quality level. Tracking quality level allows order management system 102 to use only relevant printing devices in the print shop that can achieve the required quality level. This feature also takes into account those printing devices that can achieve the assigned quality level that are not currently processing print jobs. For example, printing device 106 enjoys an achievable quality level of premium quality level 114A. It would not make sense to route all of the print jobs in column D to printing device 106 as it can achieve all the assigned quality levels. Order management system 102 routes print jobs to other printing devices according to the assigned quality levels and the achievable quality levels.

Referring to table 400, column A lists the printing devices in system 100. As shown in FIG. 1, printing devices 104, 106, and 108 are available. In some embodiments, a large number of printing devices may be available. These printing devices may be grouped according to quality levels, as disclosed in greater detail below. Column B lists the achievable quality levels based on the printing device's current ability. Printing device performance may degrade over time so that the printing device is not able to achieve higher quality levels for print jobs. As shown, printing device 104 has an achievable quality level 104Q corresponding to standard quality level 114B. Printing device 106 has an achievable quality level 106Q corresponding to premium quality level 11A. Printing device 108 has an achievable quality level 108Q corresponding to budget quality level 114C.

Order management system 102 identifies the printing devices and their achievable quality levels. Thus, step 314 executes by selecting a printing device for the received one or more print jobs. For example, if the received print job is print job 402, then order management system 102 may select printing device 106 as it is the only that can achieve a quality level of premium. Alternatively, if the received print job is print job 110C, then order management system 102 may select printing device 108 as it may not be as busy as the higher quality level printing devices and can achieve a budget quality level, which is higher than assigned quality level 112C of cheap.

As may be shown in column C of table 400, assigned print jobs are listed. Order management system 102 may take into account quality level to track and route print jobs. Other factors also may be taken into account, such as paper, media, existing print queues, and the like. Column C, however, shows which print jobs may be selected based on the achievable quality levels. For printing device 104, print jobs 110A, 110B, or 110C may be routed thereto. For printing device 106, all print jobs may be routed thereto. For printing device 108, print jobs 110A or 110C may be routed thereto.

Step 316 executes by routing the print job to the selected printing device. Column C shows the print jobs assigned to the different printing devices taking into account the assigned quality levels and achievable quality levels of the printing devices. Printing device 104 may be assigned print job 110A because it has an assigned quality level 112A of budget quality level 114C and its achievable quality level 104Q is standard. Printing device 106 may be assigned print jobs 110B and 402 as it is the only printing device available to handle these assigned quality levels. Print job 110B may be sent here is printing device 104 already has a number of print jobs to process. Printing device 108 is assigned print job 110C as it has the lowest achievable quality level in system 100. In some embodiments, not many cheap quality level 114D print jobs are received so that the lowest quality printing device is used for these print jobs.

Step 318 executes by confirming that the selected printing device can achieve the assigned quality level and that the cost value has been paid. This step may confirm that printing may occur with causing problems at the printing device. Quality checks may be used to determine print quality at the printing devices. Further, order management system 102 may determine whether cost value is received from the customer. In some embodiments, the requirement to pay before printing may be removed. Thus, before printing print job 110A on printing device 104, order management system 102 may confirm using print quality 116A that achievable print quality 104Q is budget quality level 114C or higher. It also may confirm that cost value 450 has been paid.

Step 320 executes by determining whether printing operations on the selected printing device is confirmed. If yes, then step 322 executes by printing the print job at the selected printing device at the assigned quality level. Step 322 also may remove the cost value amount from the customer's account. If step 320 is no, then step 324 executes by routing the print job to another printing device within system 100. The above disclosed process may be repeated to select and confirm a printing device that can achieve the assigned quality level. For example, print job 402 may be sent to printing device 104. Achievable quality level 104Q cannot confirm that a premium quality level 114A is available. Order management system 102 then may route print job 402 to printing device 106.

Figure 5:
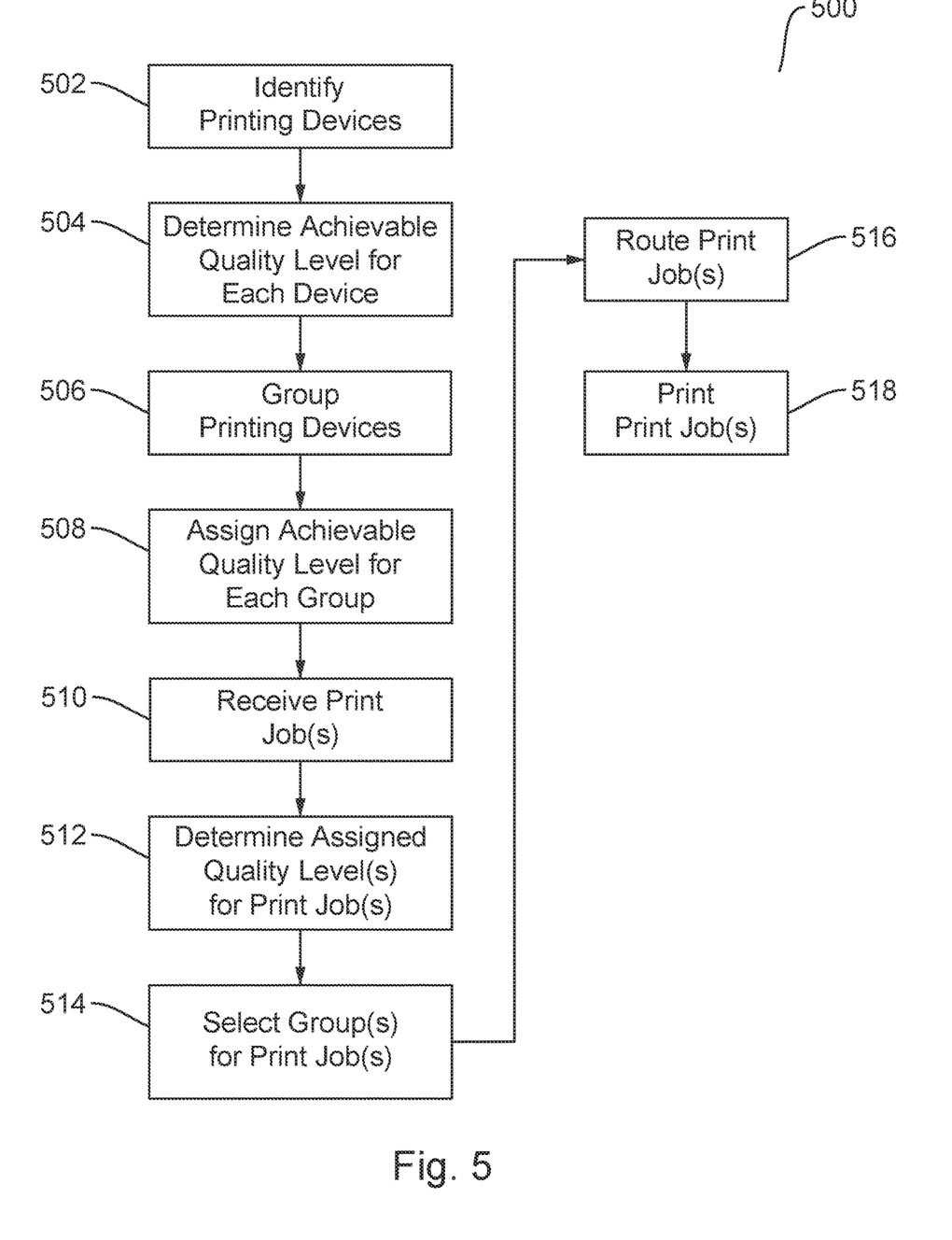
FIG. 5 illustrates a flowchart for managing print jobs for a plurality of printing devices within the print process control system according to the disclosed embodiments.

FIG. 5 depicts a flowchart 500 for managing print jobs for a plurality of printing devices 104, 106, and 108 within system 100 according to the disclosed embodiments. Flowchart 500 may refer to FIGS. 1-4 for illustrative purposes. The embodiments disclosed by flowchart 500, however, are not limited to FIGS. 1-4.

Step 502 executes by identifying the available printing devices within system 100. Referring to FIG. 1, printing devices 104, 106, and 108 are shown. More printing device also may be available within system 100 but not shown for brevity. Step 504 executes by determining an achievable quality level for each printing device. The achievable quality levels correspond to the quality levels 114 assigned to the print jobs within system 100. Referring to table 400, printing device 104 has an achievable quality level 104Q of standard. Printing device 106 has an achievable quality level 106Q of premium. Printing device 108 has an achievable quality level 108Q of budget.

Step 506 executes by grouping the plurality of printing devices into at least two groups according to the achievable quality level for each printing device within the group. For example, order management system 102 may group printing device 106 into one group, which can achieve a premium quality level 114A for print jobs. Another group may include printing device 104 and 108 for lower quality level print jobs. Another example may be a first group of printing devices having achievable quality levels of premium and standard and a second group having achievable quality levels of budget and cheap. Cost values for the printing devices may be determined per group in that the first group may charge more for a print job than the second group. The use of quality levels to determine a cost value is disclosed above. By implementing the quality level for a group for the cost value determination, order management system 102 may simplify pricing quotes for customers.

Step 508 may be executed by assigning an achievable quality level for each group. Referring to printing device 104, 106, and 108, a group of printing device 106 may be assigned premium quality level 114A. A group of printing devices 104 and 108 may be assigned budget quality level 114C as it is the lowest achievable quality level for a printing device within the group. For example, even though printing device 104 has an achievable quality level 104Q of standard, a print job sent to the group of with an assigned standard quality level 114B may not be able to be processed on printing device 108. Thus, this group has an achievable quality level of budget because every printing device can meet this requirement.

Step 510 executes by receiving one or more print jobs within system 100. Step 512 executes by determining the assigned quality levels from the one or more print jobs. This process is disclosed above. Customers may specify quality levels or order management system 102 may determine the quality level needed to complete a printing project within system 100. Referring to table 400, the print jobs in column D are assigned the quality levels shown in column E Further, order management system 102 may determine the cost values for each print job, as shown in column F.

Step 514 executes by selecting the one or more groups for the one or more print jobs based on the assigned quality level shown in column E Using the above example groups, print jobs 110B and 402 are assigned to the group including printing device 106 as it can print at the assigned quality levels of premium and standard. Print jobs 110A and 110C are assigned to the group including printing devices 104 and 108 as this group as has assigned achievable quality level of budget. Print job 110B may not be assigned to the second group because printing device 108 cannot achieve a quality level of standard. Thus, the group of printing device 106 is selected. Step 516 executes by routing the one or more print jobs to the one or more groups, as determined in step 514. Step 518 executes by printing the one or more print jobs on at least one printing device. The process for confirming and rerouting print jobs disclosed above may be applied as well.

Thus, according to flowchart 500, printing devices are grouped according to some criteria, such as achievable quality levels. Other criteria may include potential quality level that a printing device can achieve if maintenance is performed. Printing devices also may be grouped according to other criteria. Once the groups are determined, an achievable quality level is assigned to each group that corresponds to the lowest achievable quality level for a printing device within the group. In other words, the achievable quality level should apply to all printing devices within the group. Print jobs are routed based on the assigned achievable quality level, or upon the lowest achievable quality level for a printing device within the group.

Figure 6:
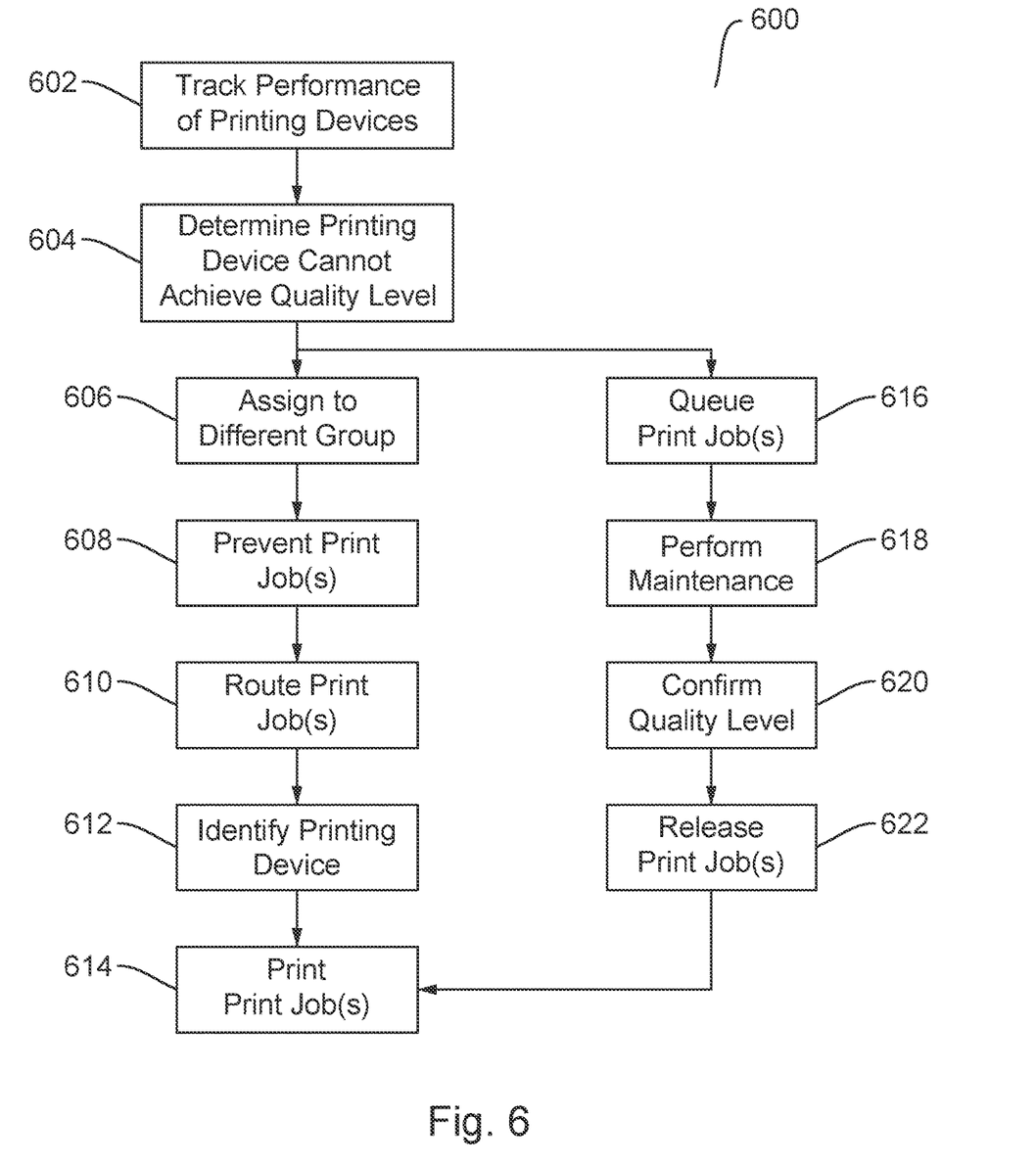
FIG. 6 illustrates a flowchart for managing a printing device within a group according to the disclosed embodiments.

FIG. 6 depicts a flowchart 600 for managing a printing device within a group according to the disclosed embodiments. As noted above, printing device capabilities degrade over time. A printing device initially assigned to a group may need to be removed from the group if its achievable quality level no longer meets group requirements. Alternatively, maintenance may be scheduled to bring the achievable quality level in line with the group's capabilities. Flowchart 600 may refer to FIGS. 1-5 for illustrative purposes. The embodiments disclosed by flowchart 600, however, are not limited to FIGS. 1-5.

Step 602 executes by tracking performance of printing devices within a group. Quality checks may be performed to track the potential and actual color reproduction performance by order management system 102. Print quality 116A may be determined for printing device 104, print quality 116B may be determined for printing device 106, and print quality 116C may be determined for printing device 108. Quality checks may be performed periodically or when requested based on customer feedback.

Step 604 executes by determining that a printing device cannot achieve its specified quality level. If the printing device is within a group, then it may be determined that the printing device cannot achieve the assigned achievable quality level. This determination indicates that the printing device cannot be used for printing operations within the group. Further, it may not receive print jobs corresponding to its potential quality level. For example, printing device 104 may be in a group with printing device 106 that has an achievable quality level of standard quality level 114B. Order management system 102 may determine that printing device 104 not longer can achieve standard quality level 114B as its achievable quality level 104Q. Its achievable quality level 104Q is now budget.

Order management system 102 may take several actions, as shown in flowchart 600. Step 606 executes by assigning the printing device to a different group based on its lower achievable quality level. Using the above example, printing device 104 now has an achievable quality level 104Q of budget. Thus, printing device 104 is assigned to a group with printing device 108, which also has an achievable quality level 108Q of budget. Order management system 102 may update its group listings accordingly.

Step 608 also may execute by preventing one or more print jobs having a standard quality level 114B from printing on printing device 104. Order management system 102 may prevent print jobs from being routed to printing device 104 based on print quality 116A. Step 610 executes by routing these one or more print jobs to another printing device that can meet the assigned quality level. Step 612 executes by identifying the printing device to meet the assigned quality level. The one or more print jobs are routed to the identified printing device to handle the halted print jobs. For example, order management system 102 may identify printing device 108 as having an achievable quality level 106Q of premium, which also includes standard quality level 114B. Print jobs having an assigned quality level 112A of standard sent to printing device 104 are then rerouted to printing device 106. Printing device 108 is not considered as it cannot achieve a quality level to meet the ones assigned to the print job. Step 614 executes by printing the one or more print jobs at the identified printing device, or, in the above example, printing device 108.

In some embodiments, step 616 executes by queuing, or delaying, the one or print jobs having an assigned quality level 114B at printing device 104. Instead of routing the halted print jobs to another printing device, order management system 102 may instruct printing device 104 to store them until the quality level problems can be resolved. Step 618 executes by performing maintenance on the printing device to return it to its potential quality level for color printing. Order management system 102 may instruct maintenance be performed on printing device 104 to return it to an achievable quality level 104Q of standard or maybe even premium. Once maintenance is complete, step 620 executes by confirming the achievable quality level is available for the printing device. Using the above example, order management system 102 confirms that achievable quality level 104Q for printing device 104 meets the requirements to print at standard quality level 114B. Step 622 executes by releasing the one or more print jobs from the queue that were delayed. Flowchart 600 then proceeds to step 614 to print the one or more print jobs on printing device 104 at standard quality level 114B.

Figure 7:
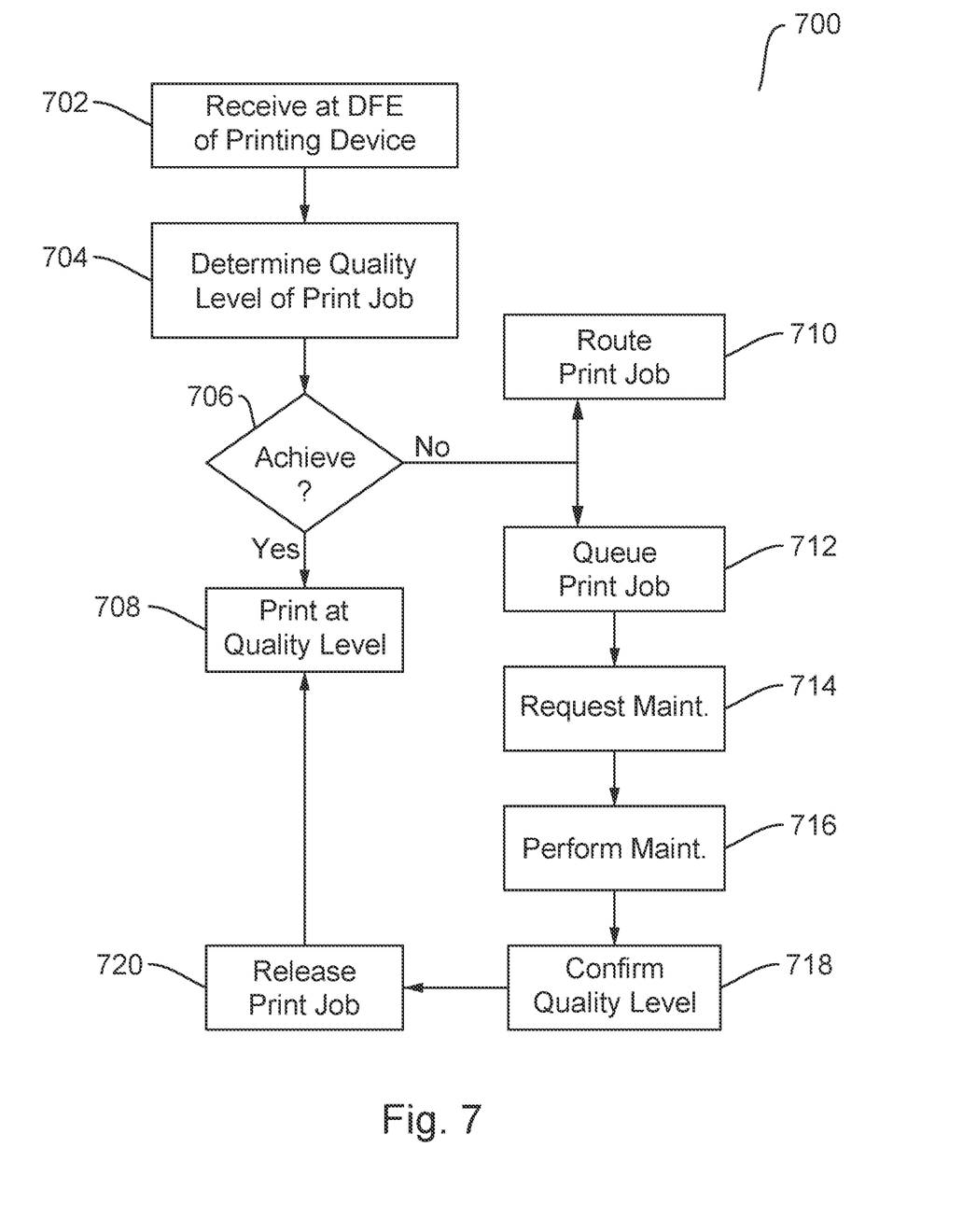
FIG. 7 illustrates a flowchart for managing a print job at a printing device based on an assigned quality level according to the disclosed embodiments.

FIG. 7 depicts flowchart 700 for managing a print job at a printing device based on an assigned quality level according to the disclosed embodiments. Management of print jobs that are not achievable also may be managed at the printing device as opposed to order management system 102. Flowchart 700 may refer to FIGS. 1-6 for illustrative purposes. The embodiments disclosed by flowchart 700, however, are not limited to FIGS. 1-6.

Step 702 executes by receiving print jobs at the digital front end (DFE) of the printing device. For example, printing device 104 may receive print jobs at its DFE. Print jobs may be sent by order management system 102 based on the assigned quality levels for the print jobs and achievable quality level 104Q of printing device 104. Going forward, a single print job is disclosed but the process of flowchart 700 may apply to a plurality of print jobs.

Step 704 executes by determining the assigned quality level of the print job. The assigned quality level may be assigned by order management system 102, as disclosed above. Using the above example, print job 110A has an assigned quality level 112A of budget with a cost value 450. Step 706 executes by determining whether the printing device can achieve the assigned quality level for the print job. As disclosed above, the printing device may perform quality checks to indicate its achievable quality level. Using the above example, printing device 104 receives print job 110A. Printing device 104 determines whether it can meet assigned quality level 112A based on its achievable quality level 104Q. If yes, then step 708 executes by printing the print job at the assigned quality level.

If step 706 is no, then the printing device may take some actions. One such action may be disclosed by step 710, which executes by routing the print job to another printing device within system 100. Printing device 104 may check with order management system 102 on which printing devices are available to process print job 110A. Order management system 102 may indicate printing device 106 is available. Printing device 104 then routes print job 110A to printing device 106, which has an achievable quality level 106Q of premium.

Alternatively, flowchart 700 may proceed to step 712, which executes by queuing the print job at the printing device. This action may delay printing operations for the print job. For example, print job 110A may be stored at printing device 104. An alert may be sent to order management system 102 about the delay and that print job 110A cannot be processed. Step 714 executes by requesting maintenance be performed on the printing device. Using the above example, order management system 102 or printing device 104 may request maintenance be done to return the printing device to an achievable quality level 104Q corresponding to standard quality level 114B. Step 716 executes by performing the maintenance at the printing device. Step 718 executes by confirming the printing device can meet the requirements for the assigned quality level of the delayed print job. Upon confirmation, step 720 executes by releasing the print job from the queue. Flowchart 700 then proceeds to step 708.

Using the above example, printing device 104 receives maintenance. After the maintenance is complete, printing device 104 confirms that it can print at standard quality level 114B, which meets assigned quality level 112A of print job 110A. Print job 110A is released from the storage queue and processed on printing device 104 accordingly.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more MFP systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A print process control method comprising:
   receiving a request for a print job of a document;
   assigning a quality level from a plurality of quality levels for the print job for each of a plurality of printing devices, wherein the quality level corresponds to a deviation between a potential reproduction of a color and an actual reproduction of the color;
   determining a cost value for printing the document according to the quality level, wherein the cost value is one of a plurality of cost values, each cost value corresponding to one of the plurality of quality levels;
   routing the print job to a first printing device from the plurality of printing devices to process the print job according to the quality level, wherein the first printing device can achieve the quality level for the print job;
   confirming the first printing device can achieve color tolerances within a gamut of colors available for color printing, the color tolerances corresponding to the quality level assigned for the print job and confirming that the cost value is paid;
   printing the document of the print job at the quality level on the first printing device; and
   removing the cost value from an account corresponding to the print job.

2. The method of claim 1, further comprising selecting the first printing device from the plurality of printing devices according to the quality level defined for the print job.

3. The method of claim 2, further comprising not selecting a second printing device from the plurality of printing devices because the second printing device cannot achieve the quality level defined for the print job.

4. The method of claim 1, wherein the confirming step includes determining that the first printing device cannot achieve the quality level defined for the print job.

5. The method of claim 4, further comprising routing the print job to a third printing device from the plurality of printing devices based on the quality level defined for the print job.

6. The method of claim 1, wherein the defining step includes specifying the quality level for the print job from the plurality of quality levels, and wherein each of the plurality of quality levels results relates to a different cost value.

7. The method of claim 6, further comprising generating a specific quote for the print job based on the quality level and the cost value.

8. The method of claim 6, further comprising aggregating information from the plurality of printing devices to determine each of the plurality of quality levels.

9. The method of claim 1, wherein the deviation relates to a characterized reference print condition.

10. A method for managing a plurality of printing devices within a printing system, the method comprising:
    determining an achievable quality level for each of the plurality of printing devices wherein the achievable quality levels for the plurality of printing devices correspond to color tolerances within a gamut of colors available for color printing;

grouping the plurality of printing devices into at least two groups of printing devices according to the achievable quality level for each printing device within the group;

receiving a print job having an assigned quality level within the printing system, wherein the assigned quality level corresponds to a deviation between a potential reproduction of a color and an actual reproduction of the color;

selecting one of the at least two groups of printing devices according to the defined quality level;

routing the print job to a printing device within the selected group of printing devices;

confirming that the printing device can print at the achievable quality level; and printing the print job at the printing device.

11. The method of claim 10, further comprising assigning the printing device to a different group of the at least one groups based its achievable quality level.

12. The method of claim 11, further comprising performing maintenance on the printing device to improve the achievable quality level of the printing device.

13. The method of claim 11, wherein assigning includes assigning the printing device to the different group having a lower achievable quality level than the current achievable quality level for the printing device.

14. The method of claim 13, further comprising preventing printing of a subsequent print job having the current achievable quality level for the printing device.

15. The method of claim 14, further comprising routing the subsequent print job to another printing device that can achieve the current achievable quality level.

16. A print process control system of a plurality of printing devices, the printing system configured to receive a request for a print job of a document;

define a quality level from a plurality of quality levels for the print job for each of a plurality of printing devices, wherein the quality level corresponds to a deviation between a potential reproduction of a color and an actual reproduction of the color;

determine a cost value for printing the document according to the quality level, wherein the cost value is one of a plurality of cost values, each cost value corresponding to one of the plurality of quality levels;

route the print job to a first printing device from the plurality of printing devices to process the print job according to the quality level, wherein the first printing device can achieve the quality level for the print job;

confirm the first printing device can achieve color tolerances within a gamut of colors available for color printing, the color tolerances corresponding to the quality level defined for the print job and confirm that the cost value is paid;

print the document of the print job at the quality level on the first printing device; and remove the cost value from an account corresponding to the print job.

17. The print process control system of claim 16, further configured to select the first printing device from the plurality of printing devices according to the quality level defined for the print job.

18. The print process control system of claim 17, further configured to not select a second printing device from the plurality of printing devices because the second printing device cannot achieve the quality level defined for the print job.

19. The print process control system of claim 16, further configured to determine that the first printing device cannot achieve the quality level defined for the print job.

20. The print process control system of claim 19, further configured to route the print job to a third printing device from the plurality of printing devices based on the quality level defined for the print job.

* * * * *